United States Patent [19]

Schwärzler

[11] Patent Number: 5,536,098
[45] Date of Patent: Jul. 16, 1996

[54] BEARING ASSEMBLY FOR A WHEEL HUB/CONSTANT VELOCITY UNIVERSAL JOINT UNIT

[75] Inventor: Peter Schwärzler, Glattbach, Germany

[73] Assignee: Löhr & Bromkamp GmbH, Offenbach am Main, Germany

[21] Appl. No.: 75,053

[22] Filed: Jun. 10, 1993

[30] Foreign Application Priority Data

Jun. 12, 1992 [DE] Germany ............................. 42 19 213.7

[51] Int. Cl.$^6$ ...................... B60B 27/02; F16C 11/06
[52] U.S. Cl. ...................... 403/259; 403/318; 403/359; 464/178; 384/544; 301/105.1
[58] Field of Search ...................... 403/259, 318, 403/319, 355, 356, 359; 464/178, 182; 301/126, 131, 132, 124.1, 105.1; 180/258, 259; 384/544

[56] References Cited

U.S. PATENT DOCUMENTS

| | | |
|---|---|---|
| 1,922,929 | 8/1933 | Chamberlain ............................. 403/259 |
| 3,031,216 | 4/1962 | Shaw ...................................... 403/259 |
| 4,290,211 | 9/1981 | Paine et al. ............................. 403/318 |
| 4,433,877 | 2/1984 | Colanzi ................................... 403/259 |
| 4,652,168 | 3/1987 | Brandenstein ........................... 403/259 |
| 4,765,688 | 8/1988 | Hofmann et al. ........................ 464/178 |
| 5,209,701 | 5/1993 | Ishikawa .................................. 464/178 |

Primary Examiner—Richard A. Bertsch
Assistant Examiner—William Wicker
Attorney, Agent, or Firm—Harness, Dickey & Pierce

[57] ABSTRACT

A bearing assembly for a wheel hub/constant velocity universal joint unit which includes a double-row bearing which has a one-piece outer bearing ring to be connected to a wheel carrier. The bearing inner bearing rings are directly formed by the wheel hub, on the one hand, and by the outer part of the constant velocity universal joint, on the other hand. The parts non-rotatingly engage one another in a form-fitting way and are axially tensioned relative to one another, with the wheel hub, on the one hand, and the outer part of the constant velocity universal joint, on the other hand, including form-fitting engaging mechanism, which are adapted to one another and which enable the two parts to be connected in only one single angular position relative to one another.

9 Claims, 3 Drawing Sheets

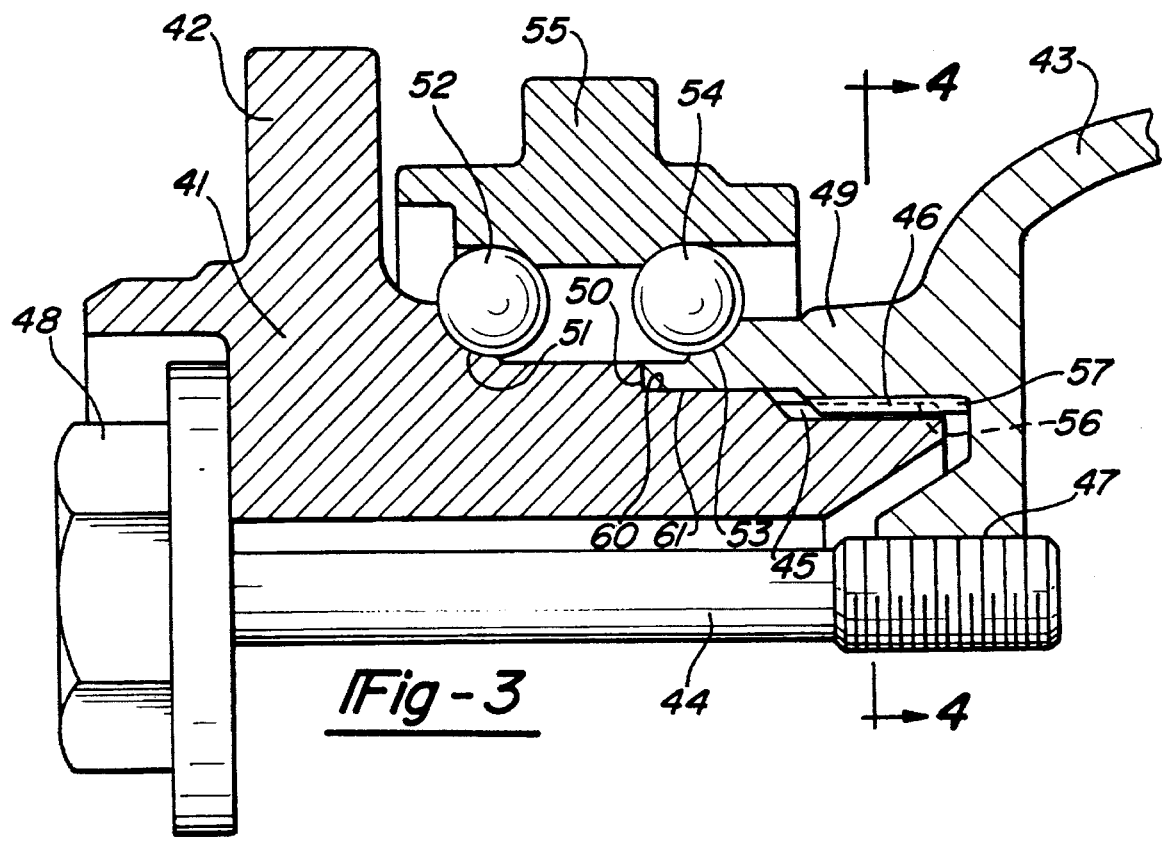
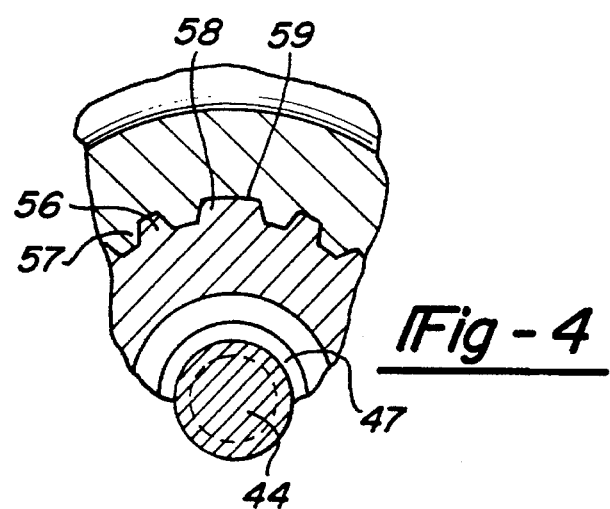

BEARING ASSEMBLY FOR A WHEEL HUB/CONSTANT VELOCITY UNIVERSAL JOINT UNIT

BACKGROUND OF THE INVENTION

The invention relates to a bearing assembly for a wheel hub/constant velocity universal joint unit which includes a double-row bearing. The double-row bearing includes a one-piece outer bearing ring, which is connected to a wheel carrier, and inner bearing rings which are directly formed by the wheel hub, on the one hand, and by the outer part of the constant velocity universal joint, on the other hand. The parts non-rotatingly engage one another in a form-fitting way and are axially tensioned and radially centered relative to one another. The invention also relates to a method of producing such an assembly.

Bearing assemblies of this type are known from DE-AS 19 15 932. Because both rows of the rolling contact bearing are assembled entirely axially, it is possible to fill the bearings with a large number of balls.

U.S. Pat. No. 4,433,877 discloses a wheel hub/constant velocity universal joint unit. In this patent, the form intervention means is formed on the outer joint part of the wheel hub as well as the journal, which likewise cooperates with a corresponding form intervention means on an annular safety element. The parts are tensioned by means of a nut axially screwed onto the journal. Thus, rotation of the wheel hub on the journal of the outer joint part is prevented by torque transfer from the outer joint part on the wheel hub.

One problem regarding such assemblies is even if the two rolling contact bearing tracks radially deviate just slightly from one another, the joint, after having been assembled, may be subject to radial twisting which reduces the service life due to additional loads. As the two bearing tracks are provided on different components, such relative radial deviations have so far never been fully eliminated or only reduced after incurring a great, deal of expenditure.

SUMMARY OF THE INVENTION

It is an object of the present invention to provide an assembly of the initially mentioned type where the two inner bearing tracks are matched more accurately to prevent radial deviations.

The objective is achieved by providing a wheel hub, on the one hand, and an outer part of a constant velocity universal joint, on the other hand, with form-fitting engaging mechanisms which are adapted to one another and which enable the two parts to be connected in only one single angular position relative to one another. According to the state of the art, the inner bearing tracks of such assemblies as well as the bearing tracks in the outer bearing ring are ground prior to assembling the bearing.

The assembly in accordance with the invention enables the one and only relative angular position which is possible during full and final assembly to be set without involving any special measures and excluding any misalignments, even during the machining operation, especially when grinding the inner bearing tracks. As a result, a method of producing such an assembly in accordance with the invention is obtained where the wheel hub and the outer joint part, excluding the outer bearing ring, are assembled with unmachined bearing tracks in the relative angular position as predetermined by the engaging means. The inner bearing tracks for both rolling contact bearing rows are ground in this position by a joint tool. Subsequently, to complete assembly, the wheel hub and the outer joint part are dismantled and re-assembled while fully assembling the bearing, including the outer bearing ring and the bearing balls.

To the extent that any slight radial run-out occurs while grinding the inner bearing rings, it is ensured by the design in accordance with the invention that such run-out occurs accordingly also while fully and finally assembling the assembly, including the bearing, so that any relative radial twisting between the tracks of both rows is excluded. This is insured by the non variable position of the mutual engaging mechanism of the wheel hub and outer joint part. Any slight out-of-roundness, as such, is of secondary importance and is accepted.

The mutual engaging mechanism may be obtained by providing an individual spring/groove engagement at the circumference or at the end faces of the parts. The outer joint part and wheel hub include splines in order to ensure mutual non-rotating engagement. It is possible, in a particularly advantageous way, to eliminate at least one tooth engagement from the two complete sets of teeth so that in this region any cooperation with completely toothed regions is impossible. This measure results in the specific angular position of the two parts relative to one another.

According to a first embodiment it is proposed that the engaging mechanism include outer teeth at the wheel hub and inner teeth at the outer joint part. Thus, at least one tooth is eliminated in both parts.

According to an alternative design, the engaging mechanism includes inner teeth at the wheel hub and outer teeth at the outer joint part. Thus, at least one tooth is eliminated in both parts.

Furthermore, it is advantageous to provide both parts to be tensioned with radial faces whose axial distance from the inner tracks of the rolling contact bearing is dimensioned such that when they abut and are tensioned relative to one another, they effect the required axial pretension of the double-row wheel bearing.

From the following detailed description taken in conjunction with the accompanying drawings and subjoined claims, other objects and advantages of the present invention will become apparent to those skilled in the art.

BRIEF DESCRIPTION OF THE DRAWINGS

FIG. 3 is a longitudinal section view of an assembly in accordance with the invention, with a projection being provided at the outer joint part.

FIG. 4 is a cross section view of FIG. 3 through line 4—4 thereof.

DETAILED DESCRIPTION OF THE PREFERRED EMBODIMENTS

Figure 1:
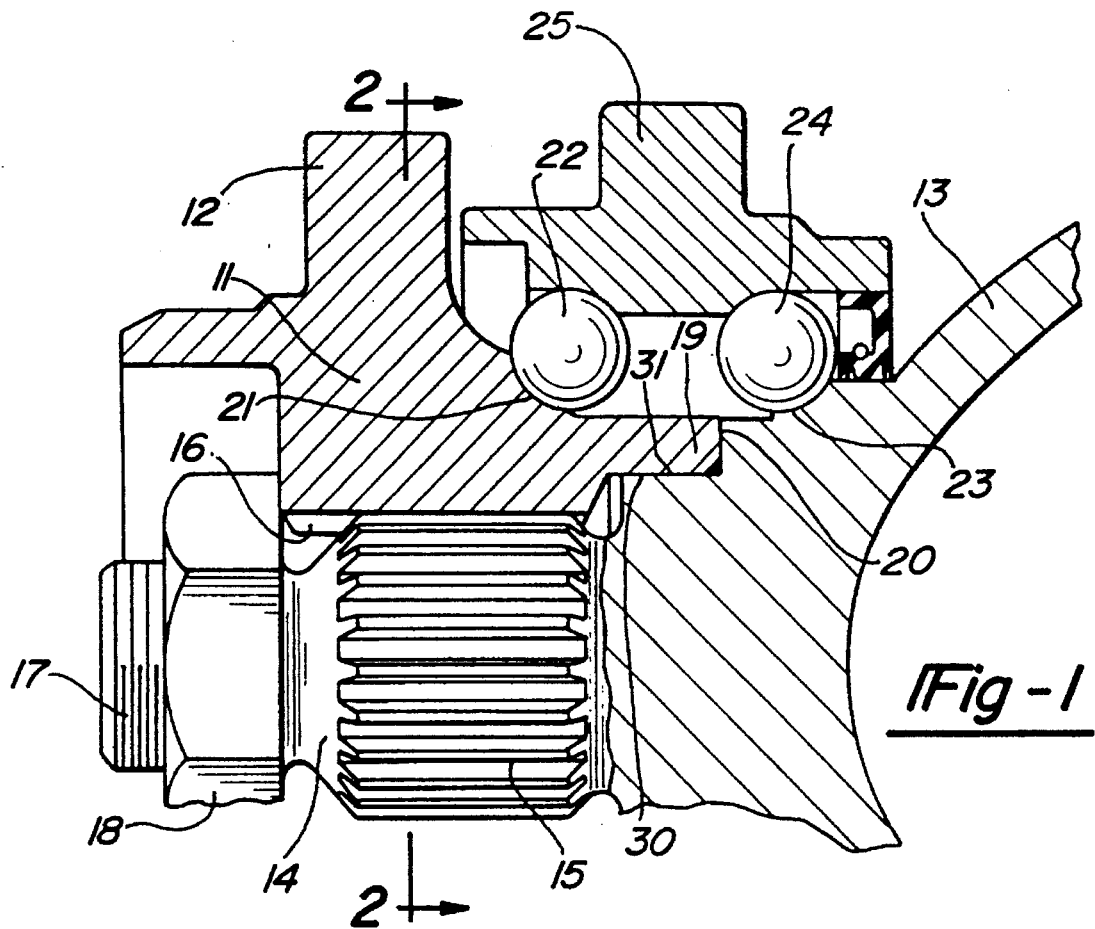
FIG. 1 is a longitudinal section view of an assembly in accordance with the invention, with a journal being provided at the outer joint part.

FIG. 1 shows a wheel hub 11 having a wheel flange 12. An outer joint part 13, of a constant velocity universal joint (not illustrated in full), is axially tensioned and connected to the flange 12 in a non-rotating way. For this purpose, a journal 14 is provided which is attached to the outer joint part 13.

The journal 14 includes shaft teeth 15 via which it engages corresponding inner teeth 16 of the wheel hub. At its free end, the journal 14 includes a thread 17 for threading on a nut 18 which is axially supported on the wheel hub 11. Axial tensioning is limited by a cylindrical projection 19 at the wheel hub 11. The cylindrical projection, via its end face is supported on a step 20 of the outer joint part 13.

The wheel hub 11 includes a first inner bearing track 21 which accommodates a first row of bearing balls 22. The outer joint part 13 is provided with a second inner bearing track 23 which supports second bearing balls 24. The bearing balls are tensioned relative to the one-piece outer bearing ring 25.

An inner cylinder surface 30 on the projection 10 on the outer joint part 13 forms a mutual radial engaging mechanism of the wheel hub 11 and outer joint part 13.

Figure 2:
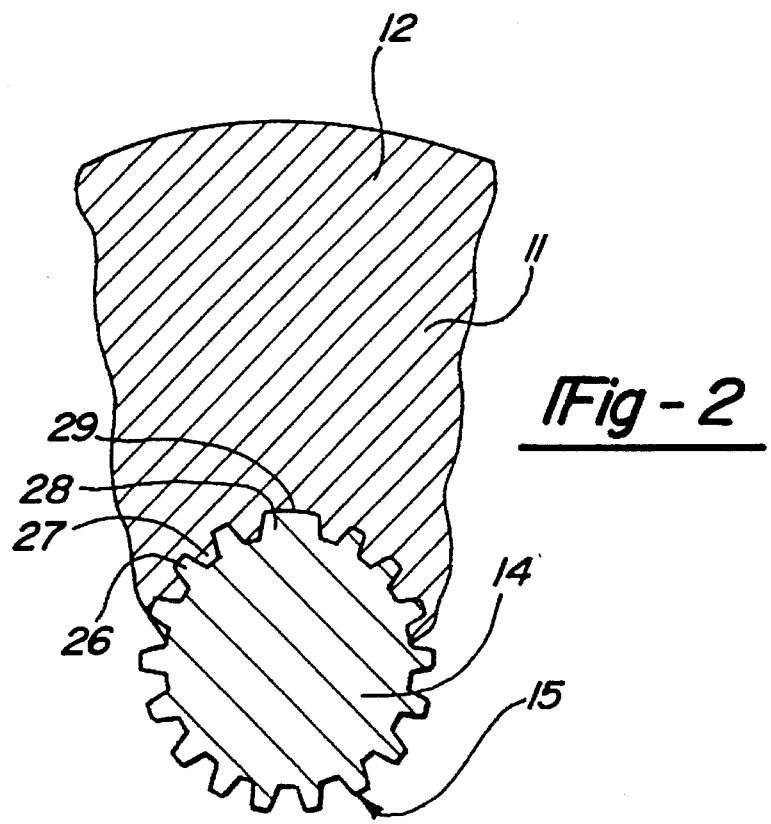
FIG. 2 is a cross section view of FIG. 1 along line 2—2 thereof.

As can be seen in the cross-section in FIG. 2, the set of outer teeth 15 of the journal 14 includes a multitude of teeth 26 which cooperate with corresponding teeth 27 in the wheel hub. Furthermore, the set of teeth 15 includes one single tooth 28 of an increased width which engages a corresponding recess 29 in the wheel hub, thereby ensuring that, through their relative angular position, the wheel hub and outer joint part are associated with one another in a specific way.

FIG. 3 shows a wheel hub 41 with a wheel flange 42. The outer part 43, of a constant velocity universal joint (not illustrated in full), is axially tensioned and connected to the flange 42 in a non-rotating way. For this purpose, a bolt 44 is provided which is threaded into a thread 47 in the outer joint part 43. The bolt, via its head 48, is axially supported on the wheel hub 41. Axial tensioning is limited by a cylindrical projection 49 at the outer joint part 43. The cylindrical projection, via its end face, is supported on a step 50 at the wheel hub 41.

The wheel hub 41 includes a first inner bearing track 51 which accommodates a first row of bearing balls 52. The outer joint part 43 includes a second inner bearing track 53 which supports second bearing balls 54. The bearing balls 52, 54 are tensioned relative to a one-piece outer bearing ring 55.

At the joint end, the wheel hub 41 is provided with outer teeth 45 via which it engages corresponding inner teeth 46 in the cylindrical projection 49. A cylinder surface 60 on the wheel hub 41 and an inner cylinder surface 61 on the projection 49 of the outer joint part 43 form a mutual radial engaging mechanism of the wheel hub 41 and outer joint part 43.

As can be seen in the cross-section in FIG. 4, the set of outer teeth 45 of the wheel hub 41 includes a multitude of teeth 56 which cooperate with corresponding teeth 57 in the wheel hub. Furthermore, the set of teeth 45 includes one single tooth 58 with an increased width which engages a corresponding recess 59 in the cylindrical projection 49 of the outer joint part 43, thereby ensuring that, through their relative angular position, the wheel hub and outer Joint part are associated with one another in a specific way.

Figure 5:
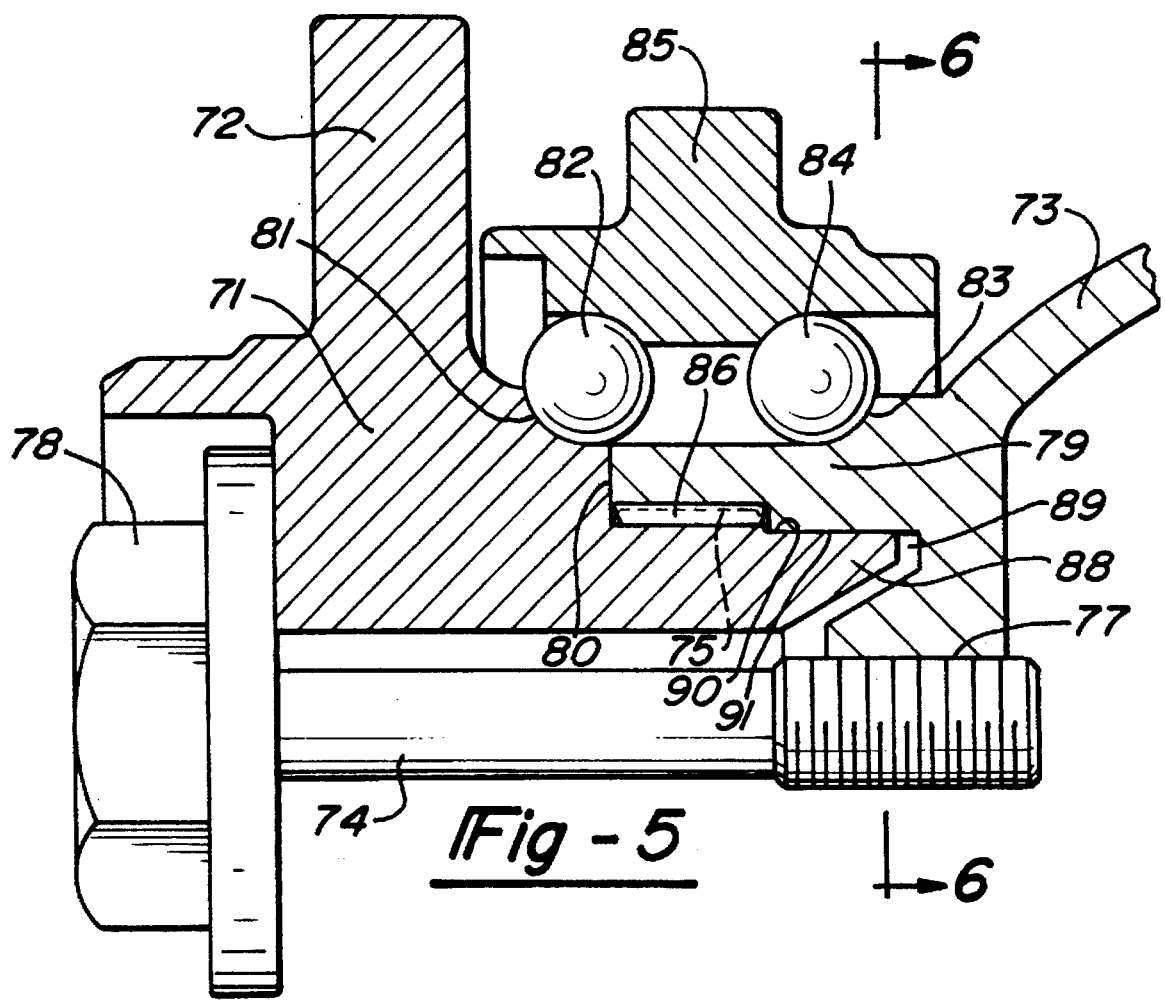
FIG. 5 is a longitudinal section view of an assembly in accordance with the invention, with a projection being provided at the outer joint part and an additional form-fitting engagement at the end faces.

FIG. 5 shows a wheel hub 71 with a wheel flange 72. The outer part 73, of a constant velocity universal joint (not illustrated in full), is axially tensioned and connected to the flange 72 in a non-rotating way. For this purpose, a bolt 74 is provided which is threaded into a thread 77 in the outer joint part 73. The bolt, via its head 78, is axially supported on the wheel hub 71. Axial tensioning is limited by a cylindrical projection 79 at the outer joint part 73. The cylindrical projection, via its end face, is supported on a step 80 at the wheel hub 71.

The wheel hub 71 includes a first inner bearing track 81 which accommodates a first row of bearing balls 82. The outer joint part 73 includes a second inner bearing track 83 which supports second bearing balls 84. The bearing balls 82, 84 are tensioned relative to the one-piece outer bearing ring 85.

Between the ball bearing rows, the wheel hub 71 is provided with outer teeth 75 via which it engages corresponding inner teeth 86 in the cylindrical projection 79 at the outer joint part 73. These driving teeth may also be provided axially in front of or behind the wheel bearing, as illustrated in FIGS. 1 and 3. At its end face, the wheel hub is provided with a projection 88 which circumferentially engages a corresponding recess 89 in the outer joint part in a form-fitting way.

Figure 6:
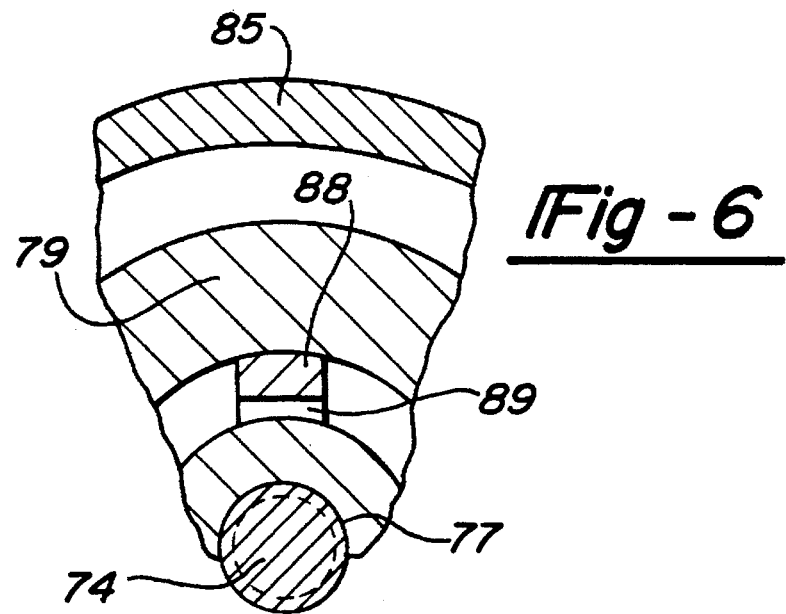
FIG. 6 is a cross section view of FIG. 5 through line 6—6 thereof.

As can be seen in the cross-section in FIG. 6, the form-fitting projection 88 has a limited width and engages a circumferentially corresponding recess 89 in the outer joint part, thereby ensuring that, through their relative angular position, the wheel hub and outer joint part are associated with one another in a specific way. A cylinder surface 90 on the wheel hub 71 and an inner cylinder surface 91 on the cylindrical projection 79 on the outer joint part 73 form a mutual radial engaging mechanism of the wheel hub 71 and outer joint part 73.

While the above detailed description describes the preferred embodiment of the present invention, the invention is susceptible to modification, variation, and alteration without deviating from the scope and fair meaning of the subjoined claims.

What is claimed is:

1. A bearing assembly for a wheel/hub constant velocity universal joint comprising:

a wheel hub;

a constant velocity universal joint including an outer joint part;

a double-row bearing, said bearing including a one-piece outer bearing ring to be connected to a wheel carrier, inner bearing rings are directly formed by the wheel hub and by the outer joint part;

said wheel hub and said outer joint part non-rotatingly engaging one another in a form-fitting way and being axially braced with each other and radially centered relative to one another along an axis of the wheel hub and the outer joint part; and form-fitting engaging means for enabling the hub and the outer joint part to be connected in only one single angular position relative to one another, said form fitting engaging means unitarily formed with said wheel hub and outer joint part.

2. An assembly according to claim 1, wherein said engaging means comprising inner teeth on the wheel hub and outer teeth on the outer joint part with at least one tooth or spline on one part and a counter-profile in the other part deviating from the remaining ones.

3. An assembly according to claim 1, wherein said engaging means comprising outer teeth at the wheel hub and inner teeth at the outer joint part with at least one tooth or spline in one part and a counter-profile in the other part deviating from the remaining ones.

4. An assembly according to claim 1, wherein the engaging means comprising at least one end projection and at least one corresponding end recess on the wheel hub and the outer joint part.

5. An assembly according to claim 1, wherein driving teeth for non-rotatingly engaging the wheel hub and the outer joint part with one another are arranged axially in front of the wheel bearing.

6. An assembly according to claim 1, wherein driving teeth for non-rotatingly engaging the wheel hub and the outer joint part with one another are arranged axially behind the wheel bearing.

7. An assembly according to claim 1, and including tensioning means for said axially bracing of the wheel hub and the outer joint part with one another.

8. An assembly according to claim 7 said tensioning means including a tensioning bolt threaded into a central internal thread in the outer joint part and including a head which is externally supported on the wheel hub.

9. An assembly according to claim 7 and including a journal which centrally adjoins the outer joint part, said journal having outer teeth which engage inner teeth in the wheel hub and a nut externally supporting the wheel hub threaded onto a thread on the journal end.

* * * * *

UNITED STATES PATENT AND TRADEMARK OFFICE
CERTIFICATE OF CORRECTION

PATENT NO. : 5,536,098
DATED : July 16, 1996
INVENTOR(S) : Peter Schwärzler

It is certified that error appears in the above-indentified patent and that said Letters Patent is hereby corrected as shown below:

Column 4, lines 37 and 38, Claim 1, "wheel/hub constant velocity universal joint"
should be --wheel hub/constant velocity universal joint unit--

Signed and Sealed this

Twenty-ninth Day of April, 1997

Attest:

BRUCE LEHMAN

Attesting Officer

Commissioner of Patents and Trademarks